Oct. 6, 1959     K. E. CAMPBELL     2,907,841
SIGNAL DEVICE

Filed June 10, 1958     2 Sheets-Sheet 1

INVENTOR.
KENNETH E. CAMPBELL
BY
ATTORNEY

Oct. 6, 1959    K. E. CAMPBELL    2,907,841
SIGNAL DEVICE

Filed June 10, 1958    2 Sheets-Sheet 2

INVENTOR.
KENNETH E. CAMPBELL
BY
ATTORNEY

United States Patent Office 2,907,841
Patented Oct. 6, 1959

2,907,841

SIGNAL DEVICE

Kenneth E. Campbell, Akron, Ohio

Application June 10, 1958, Serial No. 741,124

7 Claims. (Cl. 200—61.05)

This invention relates to a device used in the bed of a person afflicted with enuresis or bed wetting, to signal when the bed has been wet and, after a short use, to stop enuresis altogether.

In the improved signaling device of this invention, a flexible support of some dielectric material is provided, and crosswise electrodes traverse substantially the entire width of the support. Alternate crosswise electrodes are attached to the different terminals of the circuit and the circuit is completed when an electrolyte shorts adjacent portions of these electrodes. This electrolyte may be in liquid form or it may be bed clothing or apparel which has been wet.

The support to which the electrodes are fastened is somewhat flexible, so as to generally conform to the shape of the surface of the mattress, as that shape is changed from time to time. It is advantageously made of a waterproof plastic.

The crosswise electrodes are advantageously made of strips of metal foil, placed close to one another crosswise across the support, forming a grid of electrodes. There are two side electrodes located adjacent the edges of the support. Alternate crosswise electrodes are connected to opposite side electrodes; one end of each crosswise electrode being connected to one side electrode and the other end coming close to, but not touching, the opposite side electrode. The side electrodes and the top electrode are preferably built up of at least two plies of metal foil and are advantageously of thicker foil to resist breaking as the support is flexed in use. One surface of all of the foil used in the electrodes is covered with a pressure-sensitive adhesive, and they are all removably adhered to the support or to one another so that all or any portion of any electrode can be removed and replaced from time to time, as required. The side electrodes are each built up from two plies of the foil, and one end of each crosswise electrode is held between two plies of the foil.

The support is advantageously composed of polyethylene. When the foil is attached to a relatively thin flexible sheet, used in a bed, it does not break as easily as when attached to a thicker sheet. Since a thicker sheet is more serviceable in a bed, the support is advantageously formed of a thinner sheet combined with a thicker sheet, preferably by taping the two together at the edges.

The foil electrodes are advantageously held to the support by a pressure-sensitive adhesive so that they can be replaced after treatment of one person and before being used in the treatment of a different person. Occasionally, in use, one of the electrodes, usually one of the crosswise electrodes becomes broken. This can be readily repaired by simply stripping it from the support. If it is a crosswise electrode, the side electrode to which it is connected is opened up to release the end of the damaged electrode. The damaged electrode is then replaced by a new electrode of metal foil. The side electrodes or any ply or plies thereof can be similarly replaced if broken in use. By making them of two plies of the foil they are serviceable even though one ply becomes broken in use.

In order to protect the side electrodes and to hold the thinner plastic to the thicker plastic, strips of insulating fabric are doubled over the edges thereof and removably adhered to them by a pressure-sensitive adhesive. The portion of the fabric on the front surface of the support not only covers the side electrodes, but also covers the free ends of the crosswise electrodes, preventing them from being rubbed loose from the support.

The electrodes are connected through a wire circuit to a signal box or other device. One of the side electrodes is advantageously provided with an extension, herein called the top electrode which extends across the support near one edge, referred to herein as the top of the support, and this extension is also advantageously covered with insulating fabric removably attached to the support. The ends of the wires leading from the signal box or the like are embedded in plies of this extension and the opposite side electrode, near one corner of the support.

Any suitable signal may be employed. It may, for example, include a bell within a box and/or a light bulb on the outside of the box. Alternatively the signal may be some sound record which is activated when the circuit is shorted.

The invention will be further described in connection with the accompanying drawings which show a preferred form of support.

In the drawings—

Figure 1:
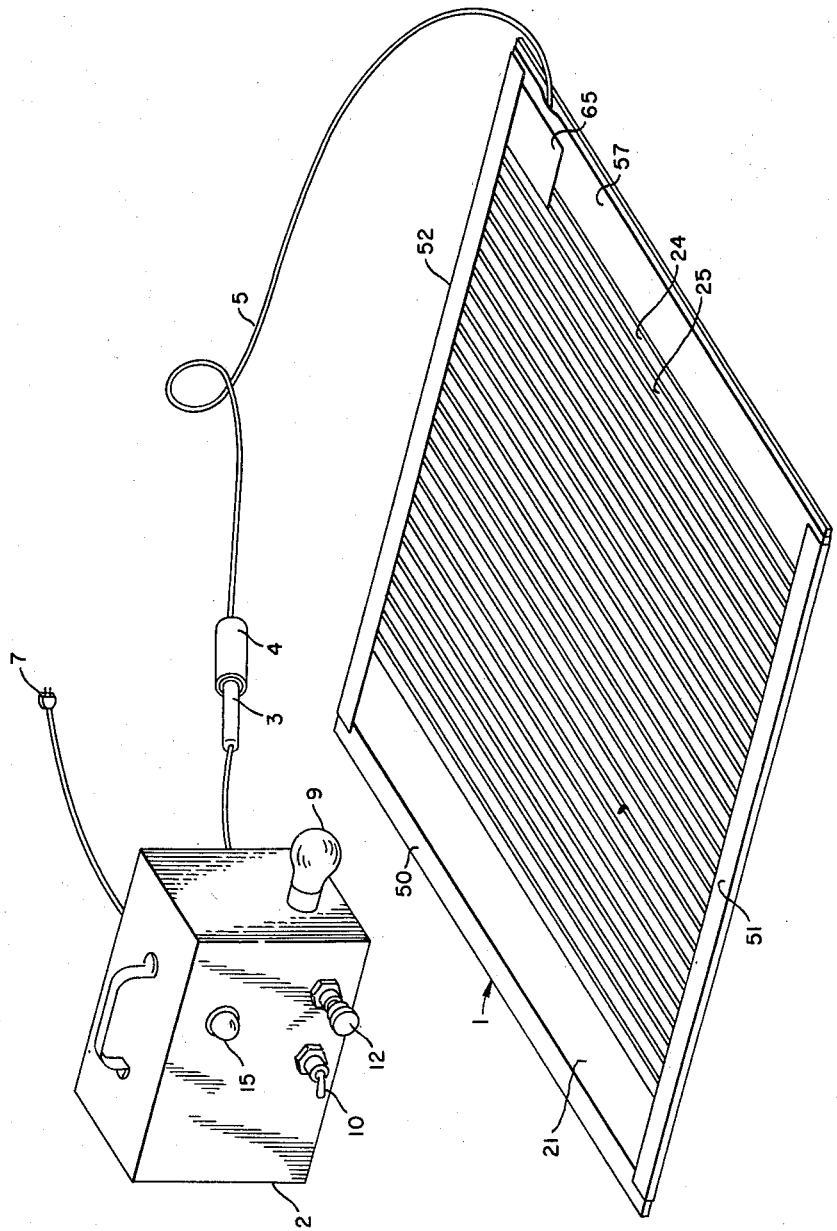
Fig. 1 shows the support with electrodes, etc. attached, connected with a signal box.
Figure 2:
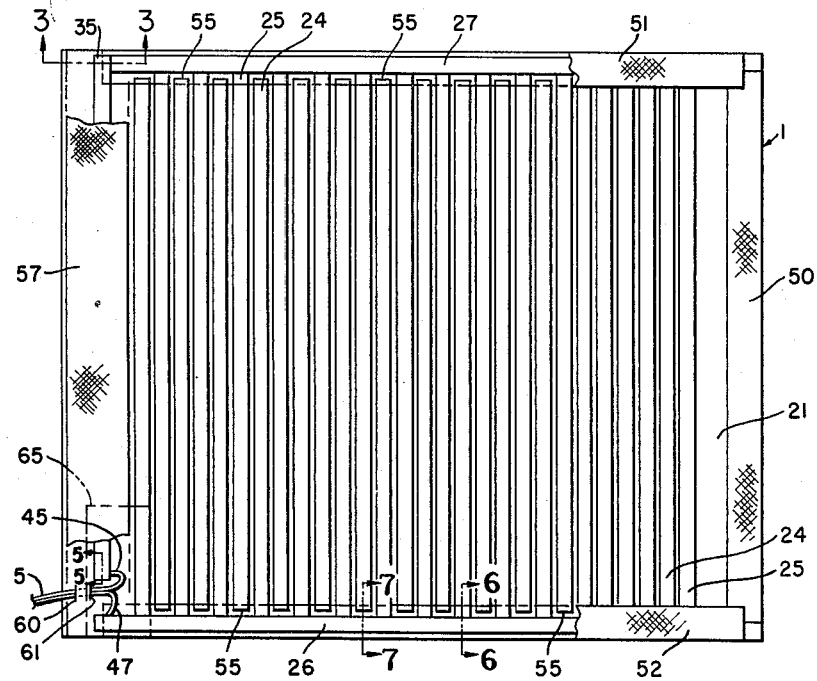
Fig. 2 is a plan view of the support with portions of the insulating tape around the border broken away to show the construction.

Figure 1 shows the completed support 1 connected with a signal box 2. The jack 3 connected with the box fits into the connector 4 which is connected through the double wire 5 to the support. The connection 7 on a lead from the box is provided to plug the entire system into a house circuit.

Within the box 2 is a transformer which reduces the house voltage to about 12 volts which is so small that it is not noticeable to one occupying the bed in which it is used. Also in the box 2 is a bell or other articulate signal. The light bulb 9 is connected into the circuit. The circuit 5 is connected through the jack with a double-throw switch within the box. When the circuit is completed or shorted by electrolyte, it throws this switch, and this causes the light to light and the bell to ring. The person within the bed, by manually throwing the switch 10, can disconnect the articulate alarm. However, the light 9 remains lighted until the device is re-set by pressing the re-set button 12. When the switch 10 has been thrown and the re-set button 12 has been positioned, a red light appears through the glass 15 indicating that the equipment is ready for use. Such signaling equipment is illustrative. Any signal may be used.

The support 1 is advantageously formed from a thicker sheet of polyethylene 20 which is perhaps 60 gauge, and a thinner sheet 21 of perhaps 20 gauge which is doubled over along one edge of the thicker sheet at 22. The support may measure some 20 to 30 inches in each direction. Alternate crosswise electrodes 24 and 25 attached to an exposed surface of the thinner sheet are connected to the side electrodes 26 and 27, respectively.

Figure 6:
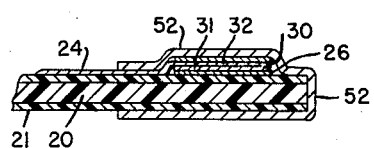
Fig. 6 is a section through one side of the support showing the construction of a side electrode and its connection to a crosswise electrode.

Figure 6 shows the cross electrode 24 connected with the side electrode 26. The end of the cross electrode is doubled over at 30 to unite the two surfaces covered with pressure-sensitive adhesive and both exposed surfaces are then free of adhesive and conduct the current better. One surface makes contact with the bottom ply 31 of the side electrode which is united to the support, and the other surface makes contact with the upper ply 32.

Figure 7:
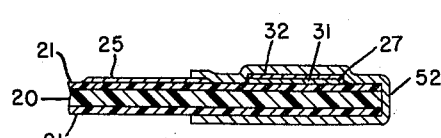
Fig. 7 is a section on the line 7—7 of Fig. 2 showing the termination of one crosswise electrode near one of the side electrodes.

In building up the signal device a single ply of the tape 31 is applied to the support near its opposite side edges. One end of each crosswise electrode 24, 25 is doubled over and pressed down on to the top of this tape 31, and the balance of the crosswise electrode is spread flat against the support and pressed to it to fasten it thereto. Figure 7 shows the electrode 25 stopping short of the two plies 31 and 32 of the side electrode 27.

Figure 3:
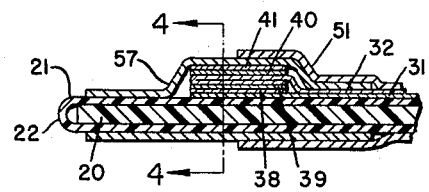
Fig. 3 is a section on the line 3—3 of Fig. 2 showing how one of the side electrodes is connected with the top electrode.
Figure 4:
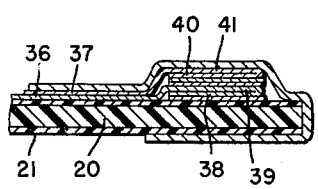
Fig. 4 is a section on the line 4—4 of Fig. 3 showing a different view of the same construction.

The side electrodes may be connected to the switchbox in any suitable manner. In the device shown a top electrode 35 is provided near the folded-over edge 22 of the thin sheet of plastic. One end of this electrode 35 is advantageously connected to one end of the side electrode 27 by interleaving the metal foils from which the respective electrodes are composed. Figures 3 and 4 show the top electrode as composed of an underply 36 and an upper ply 37 of metal foil, the bottom surfaces of which are covered with pressure-sensitive adhesive. Figure 4 shows that the ends of these strips are doubled over at 38 and 39. These are also shown in Fig. 3. The top end of the upper ply 32 of the side electrode is doubled over as shown in Fig. 3 and held between the doubled-over ends 38, 39 of the plies 36 and 37 of top electrode 35. The end of the upper ply 37 of the top electrode is folded over at 40, 41 and placed over the folded-over end of the side electrode. Thus the ends of this side electrode 27 and the top electrode are interleaved with one another.

Figure 5:
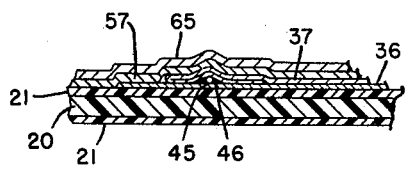
Fig. 5 is a section on the line 5—5 of Fig. 2 showing how the end of one of the wire electrodes is connected with the top electrode.

The two wires of the lead 5 connect with the opposite end of the top electrode 35 and with the top end of the side electrode 26. The ends of the wires are held between the plies of the electrodes. Figure 5 shows the wire 45 held by the solder 46 to the bottom ply 36 of the top electrode 35. The top ply 37 of this electrode overlies it. The other wire 47 is similarly soldered to the top surface of the bottom ply 31 of the top of the side electrode 26 and it is covered by the upper ply 32.

The grid of the crosswise electrodes is made from single plies of metal foil which lie close to the support and are not readily removed from the support. They are so close together that damage to one of them does not prevent any sizable spot of electrolyte forming a short between two undamaged ones.

In order to protect the built-up electrodes along the sides of the support and across the top, and to hold the different plies of plastic together, folded-over strips of fabric insulation or adhesive tape are employed. The strip 50 across the bottom of the support is applied to the front and back surfaces of the support and holds the ends of the thin plastic together and prevents the thick inner sheet of plastic 20 from slipping out from between the halves 21 of the thinner sheet. The thinner plastic sheet is held somewhat loosely to the thicker sheet so that it can flex somewhat, independently of the thicker sheet. The strips 51 and 52 of fabric insulation are fastened to the front and back sides of the support along the edges and cover the side electrodes and the unattached ends 55 of the crosswise electrodes. The top electrode 35 is covered by a strip 57 of plastic, but this need not go over the doubled-over end 22 of the support.

The ends of the wires which compose the conductor 5 are held in place by slitting the top half of the thin plastic ply 21 in two places 60, 61 near the top left corner thereof, and threading the conductor 5 through these slits. The tips of these wires are soldered to the top and side electrodes, respectively, and an extra tape 65 in the upper left-hand corner holds the wires and the ends of the top and side electrodes in place.

The construction can be varied within the scope of the claims. For instance, the support may be built up of a single ply of thinner plastic and a single ply of thicker plastic, both of the same area. Although the electrodes preferably form one large grid, different arrangements are possible. Modifications in the described construction may be made, as will suggest themselves to the man skilled in the art.

The invention is covered in the claims which follow.

What I claim is:

1. Means for signaling bed wetting which includes as a unit thereof, a thin, flat, flexible, waterproof, dielectric plastic support with pressure-sensitive adhesive adapted to be located under a person in a bed, a side foil electrode near each edge of said support with crosswise foil electrodes extending from each of said side electrodes toward the other, with one end of each alternate crosswise electrode connected to one of said side electrodes and extending almost to the other side electrode, with the edges of said crosswise electrodes spaced only a short distance from one another so as to be easily shorted when wet with electrolyte; said side electrodes being in series with a fixture adapted to be connected in an electric circuit with a signal so that when the bed is wet the signal is activated.

2. The means of claim 1 in which the crosswise electrodes are adhered to the support with pressure-sensitive adhesive.

3. The means of claim 1 in which both the crosswise electrodes and the side electrodes are adhered to the support with pressure-sensitive adhesive and the side electrodes are covered by fabric insulation removably adhered to the support.

4. The means of claim 1 in which the crosswise electrodes and the side electrodes are composed of metal foils adhesively adhered to the support with pressure-sensitive adhesive, and the side electrodes are covered by fabric insulation removably adhesively adhered to the support.

5. The means of claim 1 in which the crosswise electrodes are each a single ply of metal foil and the side electrodes are each composed of a plurality of metal foils, one of the foils of each side electrode being adhered to the support with pressure-sensitive adhesive, and another of its foils being adhered to the first-mentioned foil with pressure-sensitive adhesive, there being located between said foils of the side electrodes those ends of the crosswise electrodes which are connected with the respective side electrodes, and fabric insulation removably adhered to the support over each side electrode.

6. The means of claim 1 in which the support is composed of a heavier sheet of dielectric plastic sandwiched between the two halves of a doubled-over sheet of thinner and more flexible dielectric plastic, and in which the side electrodes are adjacent the edges of the support which are adjacent the ends of the doubled-over edge of the plastic sheet and are each composed of plies of metal foil adhered in place with pressure-sensitive adhesive, strips of fabric insulation are removably adhered to the opposite faces of said support along said edges and over the side electrodes, and another strip of fabric insulation is removably adhered to the opposite faces of said support along the edge thereof opposite said doubled-over edge of the plastic sheet.

7. Means for signaling bed wetting which includes a sheet of polyethylene of substantially 60 gauge with a sheet of polyethylene of substantially 20 gauge removably attached thereto, and thin metal foil electrodes removably adhered side by side on one surface of the thinner sheet, with a fixture in circuit with said foil and adapted to connect said foil with an electrically operated signal.

References Cited in the file of this patent

UNITED STATES PATENTS

| | | |
|---|---|---|
| 2,127,538 | Seiger | Aug. 23, 1938 |
| 2,668,202 | Kaplan | Feb. 2, 1954 |
| 2,735,907 | Inman | Feb. 21, 1956 |